(12) United States Patent
Okada et al.

(10) Patent No.: US 7,866,504 B2
(45) Date of Patent: Jan. 11, 2011

(54) STORAGE APPARATUS

(75) Inventors: Makoto Okada, Aichi-ken (JP); Hiroshi Zushi, Aichi-ken (JP); Katsuhiro Katagiri, Aichi-ken (JP)

(73) Assignee: Toyoda Gosei Co., Ltd., Aichi (JP)

( * ) Notice: Subject to any disclaimer, the term of this patent is extended or adjusted under 35 U.S.C. 154(b) by 743 days.

(21) Appl. No.: 11/431,622

(22) Filed: May 11, 2006

(65) Prior Publication Data

US 2006/0266756 A1    Nov. 30, 2006

(30) Foreign Application Priority Data

May 27, 2005    (JP)    ............................. 2005-155083

(51) Int. Cl.
  *B65D 43/14*    (2006.01)
  *B65D 43/12*    (2006.01)
  *B65D 25/00*    (2006.01)
(52) U.S. Cl. ..................... 220/830; 220/811; 220/812; 220/815; 220/345.1; 220/740
(58) Field of Classification Search ................ 220/811, 220/812, 815, 830, 345.1, 740, 835; 224/926, 224/483; 296/37.14, 37.12
  See application file for complete search history.

(56) References Cited

U.S. PATENT DOCUMENTS

| | | | | |
|---|---|---|---|---|
| 5,520,313 | A * | 5/1996 | Toshihide | ................... 224/539 |
| 6,609,631 | B2 * | 8/2003 | Asami | ........................ 220/817 |
| 6,662,405 | B2 * | 12/2003 | Vitry | ........................... 16/355 |
| 2001/0052524 | A1 * | 12/2001 | Ichimaru et al. | ............ 220/815 |
| 2003/0071047 | A1 * | 4/2003 | Harada | ........................ 220/835 |
| 2003/0080131 | A1 * | 5/2003 | Fukuo | .......................... 220/264 |
| 2006/0037965 | A1 * | 2/2006 | Hamaguchi | ................. 220/830 |

FOREIGN PATENT DOCUMENTS

| | | |
|---|---|---|
| CN | 2552842 Y | 5/2003 |
| JP | A-10-278656 | 10/1998 |
| JP | A-2000-8687 | 1/2000 |
| JP | A-2003-54302 | 2/2003 |

OTHER PUBLICATIONS

Office Action dated May 23, 2008 in corresponding Chinese patent application No. 200610083047.4 (and English translation).

* cited by examiner

*Primary Examiner*—Anthony Stashick
*Assistant Examiner*—Kareen Rush
(74) *Attorney, Agent, or Firm*—Posz Law Group, PLC

(57) ABSTRACT

A storage apparatus includes a container body, a lid member with an arm, a shaft, an urging member, and a slot. The container body has a top opening. The lid member opens and closes the top opening of the container body, and is held swingably to the container body. The arm extends downward from the lid member. The shaft supports the arm pivotably to the container body, and is fitted into the slot so as to pivotably hold the arm. The urging member urges the lid member upward. The slot extends up-and-downward. Moreover, the container body further has a receiver. The receiver is brought into contact with the lid member so as to support the lid member when the pivotably-supporting shaft moves relatively within the slot so as to move the lid member downward. Therefore, the arm and pivotably-supporting shaft hardly deform because no excessive load acts onto them.

15 Claims, 3 Drawing Sheets

Load Removed          Load Applied

STORAGE APPARATUS

BACKGROUND OF THE INVENTION

1. Field of the Invention

The present invention relates to a storage apparatus, such as cup holders for automotive applications.

2. Description of the Related Art

An automobile is provided with various on-board storage containers, such as console boxes, cup holders and glove compartments. Many storage apparatuses used so far comprise a container body having a top opening, and a lid member for opening and closing the top opening, respectively. Except the instance for putting small articles in or taking them out from a storage apparatus, the lid member covers the opening of the container body to enhance the decorativeness within a vehicle passenger room.

Many lid members are held swingably to a container body. Many lid members used so far are urged by a spring in the opening direction. In this instance, a push-lock opening device is used simultaneously in general. That is, an operator pushes the lid member with a finger to unlock the push-lock opening device so that the lid member is opened automatically by the urging force of the spring. In order to close the opening of the container body, an operator pushes the lid member again to swing so that the push-lock opening device is locked when the lid member closes the opening.

However, since such a storage apparatus is constructed so that the lid member is supported pivotably to the container body, there might arise a problem that the pivotably-supporting shaft is damaged when an excessive load acts onto the closed lid member. Hence, in order to avoid the problem, it has been carried out to provide the lid member with a metallic arm, which extends downward from the lid member and is equipped with a pin for supporting the metallic arm pivotably to the container body. Such a metallic pivotably-supporting construction can inhibit the pivotably-supporting shaft from breaking. However, since the metallic arm is usually formed as s plate shape, the metallic arm might be deformed plastically to result in troubling the opening/closing operation of the lid member when the metallic arm is subjected to an excessive load.

Note that Japanese Unexamined Patent Publication (KOKAI) No. 2003-54,302 discloses a cup holder in which a tray member is made swingable further downward from the horizontal position in order to inhibit the pivotably-supporting shaft from breaking. Moreover, Japanese Unexamined Patent Publication (KOKAI) No. 2000-8,687 discloses a console box whose shaft or bearing hole is formed as a tapered shape to disengage the engagement between the shaft and the bearing hole in order to prevent the breakage.

SUMMARY OF THE INVENTION

The present invention has been developed in view of the aforementioned circumstances. It is therefore an object of the present invention to provide a storage apparatus which can inhibit its component parts from breaking and deforming plastically so that the occurrence of opening/closing malfunction is prevented.

A storage apparatus according to the present invention can solve the aforementioned problem, and comprises:

a container body having a top opening;

a lid member for opening and closing the top opening of the container body, the lid member held swingably to the container body;

an arm extending downward from the lid member;

a shaft for pivotably supporting the arm to the container body;

an urging member for urging the lid member upward; and a slot into which the shaft is fitted so as to pivotably hold the arm, the slot extending up-and-downward; and the container body further having a receiver, which is brought into contact with the lid member so as to support the lid member when the pivotably-supporting shaft moves relatively within the slot so as to move the lid member downward.

The receiver can preferably have a cross section formed as an arc shape, which is free from interfering with the lid member.

The present storage apparatus can preferably further comprise a pin protruding from the arm, wherein: the container body can preferably be provided with a guide groove for guiding a movement of the pin accompanied by the swinging movement of the lid member; and the guide groove can preferably be provided with a descent groove for enabling the pin to move when the shaft moves relatively within the slot so as to move the lid member downward. If such is the case, the urging member can preferably urge the lid member upward by way of the pin.

In accordance with the present storage apparatus, the pivotably-supporting shaft, which supports the arm pivotably, moves relatively within the slot when an excessive load acts onto the lid member, which closes the top opening of the container body, from above. Accordingly, the entire lid member moves downward along with the arm. Consequently, the lid member is brought into contact with the receiver so that the receiver supports the lid member. As a result, no excessive load acts onto the arm and the pivotably-supporting shaft. Therefore, even when the arm is made of a metallic sheet, the arm is inhibited from deforming plastically. Thus, the present storage apparatus can prevent the opening/closing malfunction from occurring. Moreover, since no excessive load acts onto the arm and the pivotably-supporting shaft, it is possible to make the arm and/or the pivotably-supporting shaft of resin instead of metal. Hence, it is possible to furthermore reduce the weight of the present storage container.

Moreover, when the present storage container further comprises the pin, which protrudes from the arm; and the container body is provided with the guide groove, which guides a movement of the pin accompanied by the swinging movement of the lid member, the present storage container can produce a good operation feeling because the pin moves in the guide groove so as to enable the lid member to open and close the top opening of the container body stably during the ordinary opening/closing operation. In addition, when the lid member is subjected to an excessive load, the pin moves in the descent groove, which is formed in the guide groove, so as to enable the lid member to descend. Therefore, the deformation of the arm is inhibited so that the present storage apparatus can prevent the occurrence of the opening/closing malfunction in the same manner as described above.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
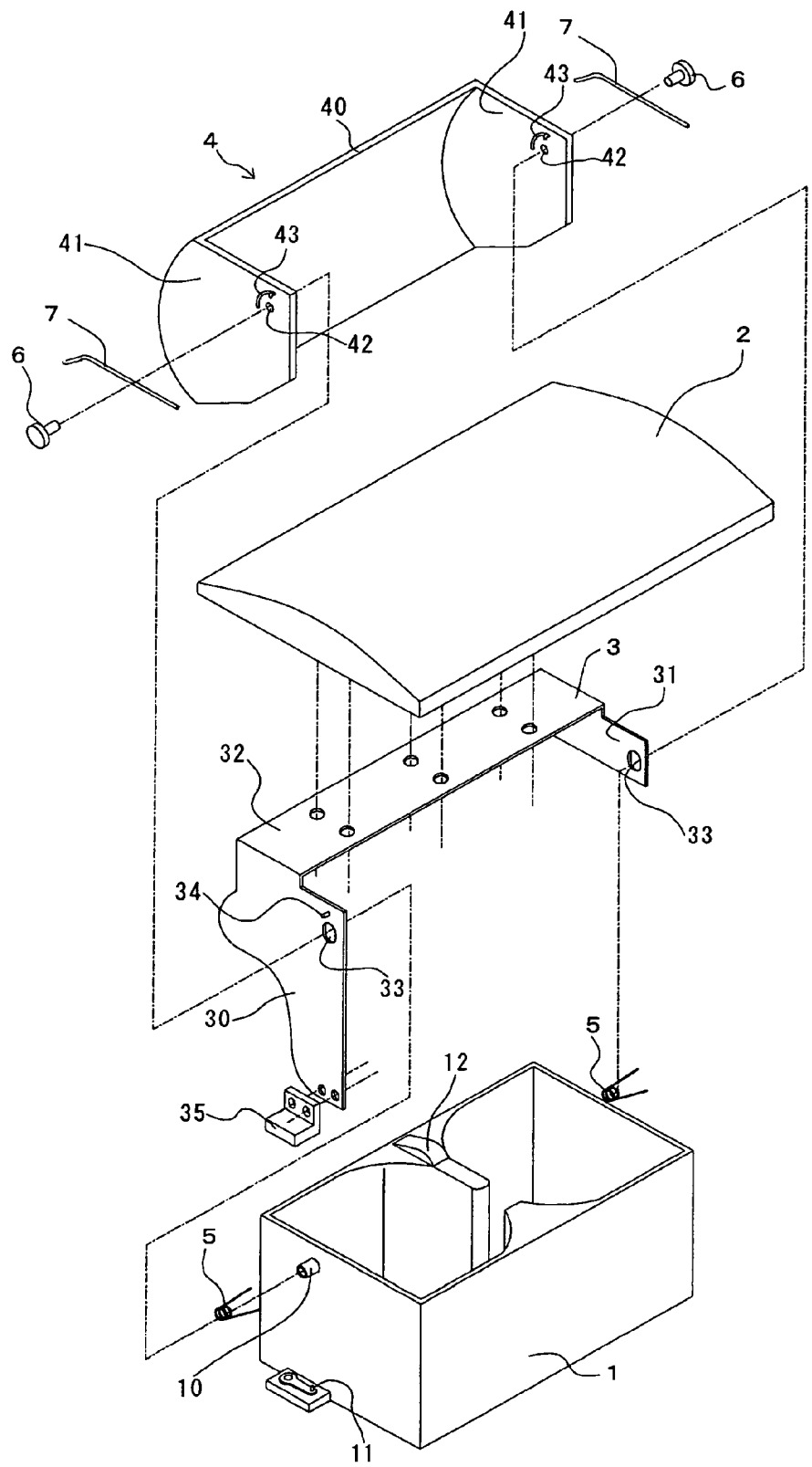
FIG. 1 is an exploded perspective diagram for illustrating a component arrangement of a storage apparatus according to an example of the present invention.

Having generally described the present invention, a further understanding can be obtained by reference to the specific preferred embodiments which are provided herein for the purpose of illustration only and not intended to limit the scope of the appended claims.

A storage apparatus according to the present invention comprises a container body, and a lid member. The container body has a top opening, which opens upward. The container body is formed as various shapes depending on the applications of the present storage apparatus. The container body is made of resin and the like.

The lid member is for opening and closing the top opening of the container body, and is held swingably to the container body. The lid member is formed in such a size that it can open and close the top opening of the container body. The lid member is provided with an arm, which extends downward from the lid member. Note that the lid member is held swingably to the container body by way of the arm. Moreover, the present storage apparatus further comprises a shaft, and a slot. The shaft is for pivotably supporting the arm to the container body. The pivotably-supporting shaft is fitted into the slot, which extends up-and-downward. Thus, the arm is supported pivotably to the container by way of the shaft, which is fitted into the slot. Note that the pivotably-supporting shaft can be formed in one of the container body and arm. Accordingly, the slot can be formed in the other one of the container body and arm. Consequently, the pivotably-supporting shaft, which protrudes from one of the container body and arm, is disposed movably in the slot, which is formed in the other one of the container body and arm. For example, when the slot is formed in the arm, the pivotably-supporting shaft, which protrudes from the container body, engages movably with the slot, which is formed in the arm. On the other hand, when the slot is formed in the container body, the pivotably-supporting shaft, which protrudes from the arm, engages movably with the slot, which is formed in the container body.

Therefore, when an excessive load acts onto the closed lid member, the slot and the pivotably-supporting shaft move relatively to each other to move the arm downward. For example, when the arm is provided with the slot, the arm moves so that the pivotably-supporting shaft moves relatively to the slot. On the other hand, when the container body is provided with the slot, the arm moves so that the slot moves relatively to the pivotably-supporting shaft.

In order to control the moving magnitude of the slot or pivotably-supporting shaft, the present storage apparatus comprises the container body, which has a receiver. The receiver is brought into contact with the lid member so as to support the lid member. Therefore, when the lid member is brought into contact with the receiver, the lid member is inhibited from moving any further. Moreover, since the receiver receives the load which the lid member exerts, no excessive load acts onto the arm.

The arm is disposed so as to extend downward from one of the opposite side surfaces of the lid member in general. However, paired arms can preferably be disposed so as to extend downward from the opposite side surfaces of the lid member, respectively. In such a preferable arrangement, since it is possible to provide the opposite-side arms with the above-described slot/supporting structures, respectively, the opposite-side arms can move uniformly even when they are subjected to an excessive load so that they are furthermore inhibited from deforming.

Moreover, at least one of the lid member and container body can preferably be provided with a guide for guiding the swinging cover in order to have the lid member swing stably. If such is the case, it is needed to dispose the guide so as not to inhibit the above-described relative movement of the slot and pivotably-supporting shaft. For example, when the present storage apparatus is constructed so that the container body is provided with a guide groove which engages with a pin protruding from the arm, it is advisable to form a descent groove, which enables the pin to move downward only when the lid member is closed, in the guide groove. In such a preferable arrangement, when an excessive load acts onto the lid member, the pin moves in the descent groove so that the slot and the pivotably-supporting shaft can move relatively to each other.

When no excessive load acts onto the lid member, it is necessary to hold the lid member in such a floating manner that it does not contact with the receiver. Hence, the present storage apparatus comprises an urging member, which urges the lid member upward. The urging member can be made of springs, or elastomers such as rubber and polyurethane. However, it is not preferable if the lid member has descended with a small load. Accordingly, as for the urging member, it is preferable to use springs, which can exert a comparatively large load to the lid member. The urging member can urge the lid member itself, but can preferably urge the arm. Note that it is convenient to utilize the above-described pin for urging the arm upward.

The receiver can be disposed at any position without limitation. However, the receiver can preferably be disposed at positions from above to rearward with respect to the pivotably-supporting shaft, for instance, on an opposite side with respect to the opening opposite end of the lid member. When the present storage apparatus further comprises a push-lock opening device, it is preferable not to dispose the receiver at portions which an operator pushes the lid member to open.

EXAMPLE

Hereinafter, the present storage apparatus will be described in detail with reference to an example.

FIGS. 1 through 4 illustrate a storage apparatus according to an example of the present invention. In the present example, the present invention is applied to a cup holder, which is disposed in an automotive console box. The cup holder comprises a box-shaped container 1, a lid member 2, a metal-plate arm 3 fastened to the lid member 2, and a cover 4 fastened to the container 1. Note that the container 1 and cover 4 make the container body according to the present storage apparatus.

The container 1 is made of resin, and is provided with opposite bosses 10. The bosses 10 are formed on both opposite right and left side surfaces of the container 1, respectively, and protrude outward therefrom. Moreover, the container 1 is provided with an engagement pin 11, which is disposed swingably on a lower side of one of the right and left side surfaces of the container 1. In addition, the container 1 opens upward, and is provided with a receiver 12. The receiver 12 protrudes upward beyond the opening of the container 1. Moreover, the receiver 12 is disposed at position, which is placed above the bosses 10 when the container 1 is viewed from one of the opposite sides. In addition, the receiver 12 is formed as an arc shape in cross section so that it does not interfere with the swinging lid member 2.

Figure 2:
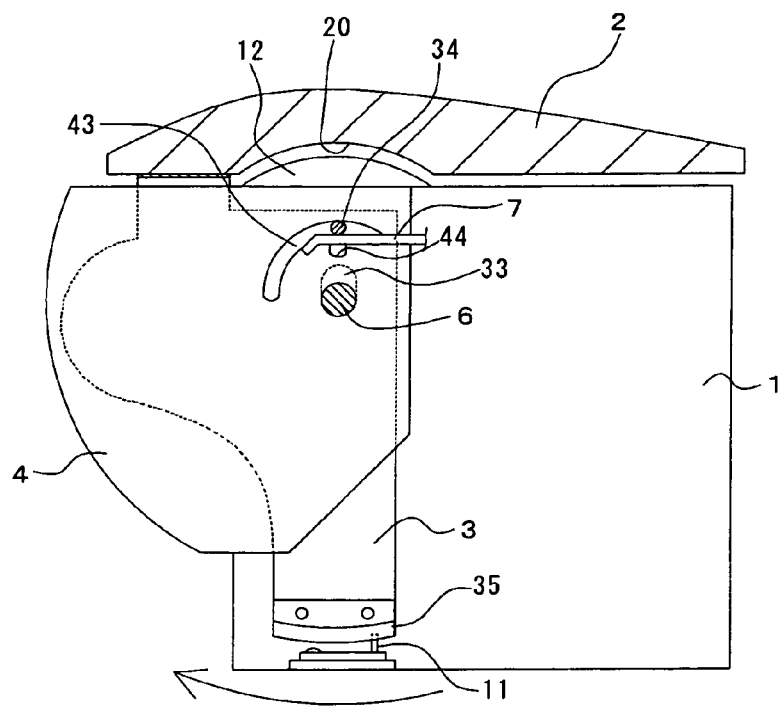
FIG. 2 is a side diagram for illustrating the storage apparatus according to the example of the present invention which is put in the closed state in a partially cross-sectional view.
Figure 3:
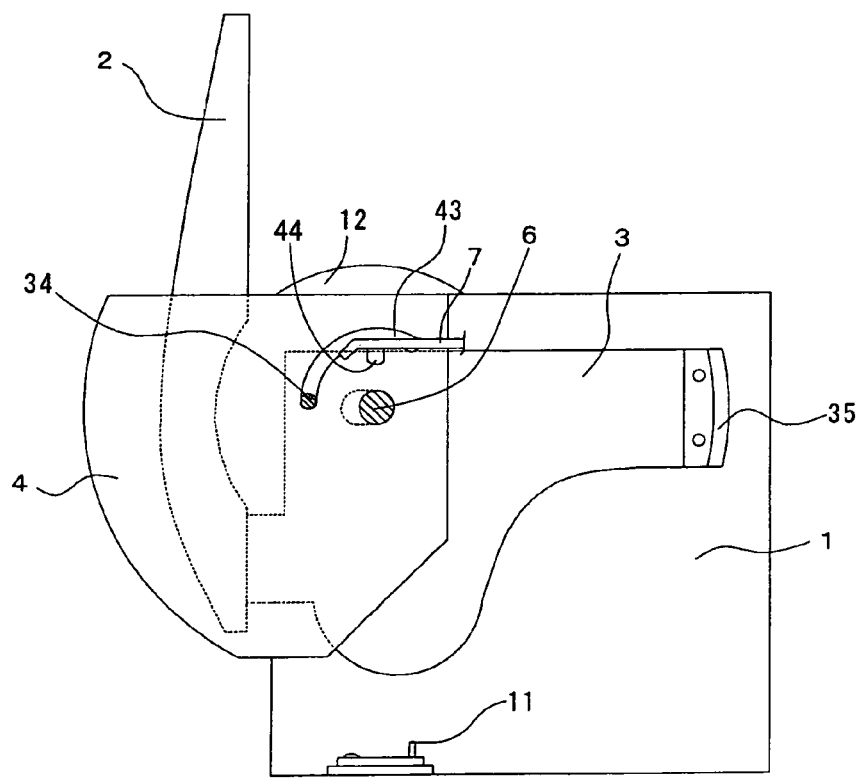
FIG. 3 is a side diagram for illustrating the storage apparatus according to the example of the present invention which is put in the opened state in a partially cross-sectional view.
Figure 4:
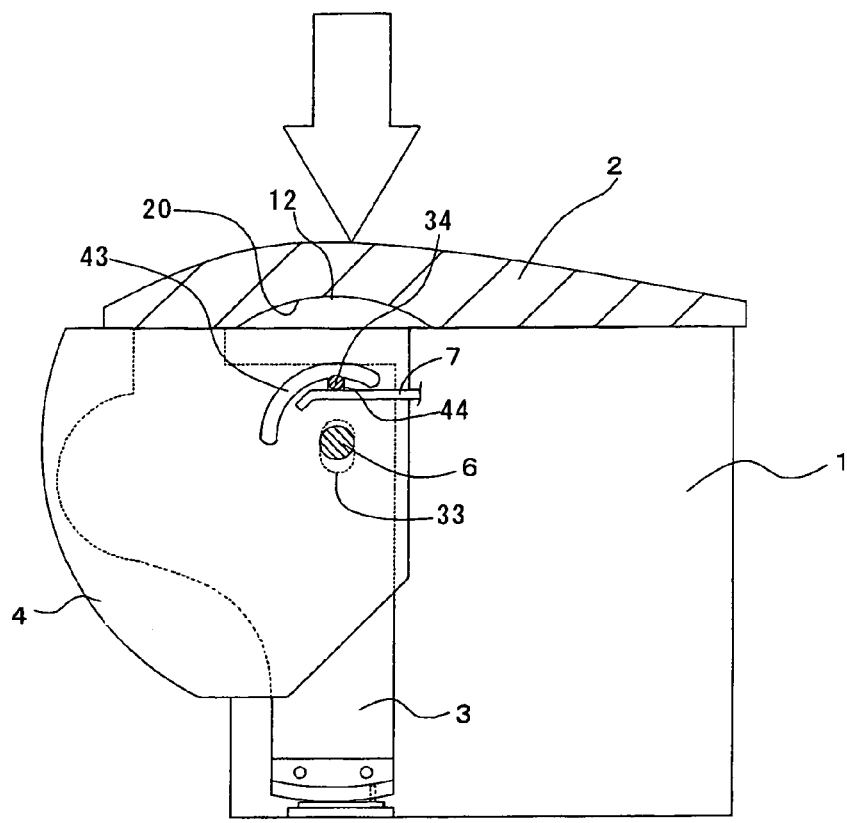
FIG. 4 is a side diagram for illustrating the storage apparatus according to the example of the present invention which is put in the closed state and is subjected to an excessive load in a partially cross-sectional view.

The lid member 2 is made of resin, and is formed as a plate shape substantially in such a size that it can cover the opening of the container 1. Moreover, the metal-plate arm 3 is fastened to the rear surface of the lid member 2 with screws (not shown). In addition, as shown in FIGS. 2 through 4, the rear surface of the lid member 2 is provided with a contact surface 20. The contact surface 20 is disposed so as to face the receiver 12, and is formed as an arc shape in cross section in the same manner as the receiver 12.

The metal-plate arm 3 comprises paired legs 30, 31, and a bridge 32, and is formed as a letter "U" shape substantially. The bridge 32 connects between the paired legs 30, 31, and is fastened to the lid member 2. The paired legs 30, 31 extend downward from the bridge 32, and are provided with a slot 33, respectively. The slots 33 are oblong and have a longitudinal dimension and a width dimension. The width dimension is perpendicular to the longitudinal dimension and is greater than the diameter of the bosses 10. Above the slots 33, a pin 34 protrudes outward, respectively. Note that both of the imaginary line connecting between the paired slots 33 and the imaginary line connecting between the paired pins 34 are formed parallel to the longitudinal direction of the container 1. Moreover, one of the paired legs 30, 31 (e.g. the leg 30) is formed longer downward than the other one of the paired legs 30, 31 (e.g., the leg 31). In addition, a cam 35, which is provided with a heart-shaped cam groove in the bottom surface, is fastened to the leading or lower opposite end of the leg 30. Note that the heart-shaped cam groove of the cam 35 engages with the engagement pin 11 of the container 1.

The cover 4 is made of resin, and comprises a back 40, and paired grips 41, 41. The back 40 is formed as an arc shape in cross section. The grips 41, 41 protrude forward from the opposite ends of the back 40 substantially perpendicularly. The grips 41, 41 are provided with a through hole 42, respectively. Above the through holes 42, a substantially arc-shaped guide groove 43 is formed so as to penetrate through the outer and inner surfaces of the grips 41, 41, respectively. Note that the guide grooves 43 are provided with a descent groove 44, respectively, as shown in FIGS. 2 through 4. The descent groove 44 branches away from the guide groove 43 at the peripheral intermediate of the guide groove 43 so as to extend downward by a short distance in the radially inward direction of the guide groove 43.

The above-described respective component parts are assembled in the following manner. First of all, the metal-plate arm 3 is fastened to the lid member 2 with screws. Then, the bosses 10 of the container 1 are fitted into the springs 5, respectively. Thereafter, the metal-plate arm 3 is disposed so as to hold the container 1 between the paired legs 30, 31. In this instance, the slots 33 and the bosses 10 are positioned coaxially. Moreover, the springs 5 are disposed between the container 1 and the metal-plate arm 3 so as to engage with them. Thus, the springs 5 urge the lid member 2 in the direction of opening the opening of the container 1. In addition, the engagement pin 11 is engaged with the cam 35 to make a push-lock mechanism.

Afterward, the cover 4 is disposed so that the paired grips 41, 41 are disposed outside the paired legs 30, 31 of the metal-plate arm 3. In this instance, the cover 4 and the metal-plate arm 3 are disposed so that the pins 34 engage with the guide grooves 43, and that the through holes 42 and the bosses 10 are positioned coaxially. Then, resinous bolts 6 are fitted into the through holes 42, respectively. Finally, the cover 4 is fastened to the container 1 with not-shown screws. Thus, the cover 4 is assembled with the container 1 integrally. Moreover, the lid member 2 comes in and out the space, which is formed between the back 40 of the cover 4 and the container 1. Accordingly, the lid member 2 and metal-plate arm 3 can swing around the resinous bolts 6. In addition, torsion springs 7 are fastened to the cover 4 at one of the opposite ends, respectively, and urge the pins 34, which protrude through the guide grooves 43, upward at the other one of the opposite ends, respectively.

In the thus assembled state shown in FIG. 2, the pins 34, the metal-plate arm 3 and the lid member 2 are lifted upward by the urging forces of the springs 5 and torsion springs 7. As a result, a clearance of about 3 mm is formed between the receiver 12 and the contact surface 20. Moreover, the slots 33 move upward to position the resinous bolts 6 at the lower end of the slots 33.

In the thus constructed cup holder according to an example of the present invention, the lid member 2 closes the opening of the container while the engagement pin 11 engages with the cam 35, as shown in FIG. 2. When an operator tries to use the cup holder beginning with being placed in such a state, he or she first pushes the leading end of the lid member 2, that is, one of the opposite ends disposed away from the metal-plate arm 3, gently. Then, the metal-plate arm 3 swings in the direction designated at the arrow of FIG. 2, the engagement pin 11 disengages from the cam 35. Accordingly, when the operator stops pressing the lid member 2, the urging forces of the springs 5 swing the metal-plate arm 3 and lid member 2 in the opposite direction with respect to the direction designated at the arrow of FIG. 2. In this instance, the pins 34 are guided stably within the guide grooves 43 without coming into the descent grooves 44, because the torsion springs 7 urge the pins 34 upward. Consequently, the metal-plate arm 3 and lid member 2 can swing free drawback, such as interference. When the pins 34 contact with the lower opposite ends of the guide grooves 43 as shown in FIG. 3, the metal-plate arm 3 and lid member 2 are inhibited from swinging any further. Under the circumstance, the lid member 2 is accommodated in the space formed between the cover 4 and the container 1 as shown in FIG. 3. Therefore, the operator can use the container 1 as a cup holder.

After the operator has completed using the cup holder according to an example of the present invention, he or she presses the leading end of the lid member 2, which protrudes against the urging forces of the springs 5, forward, that is, in the direction of approaching the opening of the container 1. Then, the lid member 2 and metal-plate arm 3 swing in the opposite direction with respect to the above-described direction. When the engagement pin 11 engages with the cam 35, the lid member 2 is held at the position where it closes the opening of the container 1 as shown in FIG. 2.

Figure 5:
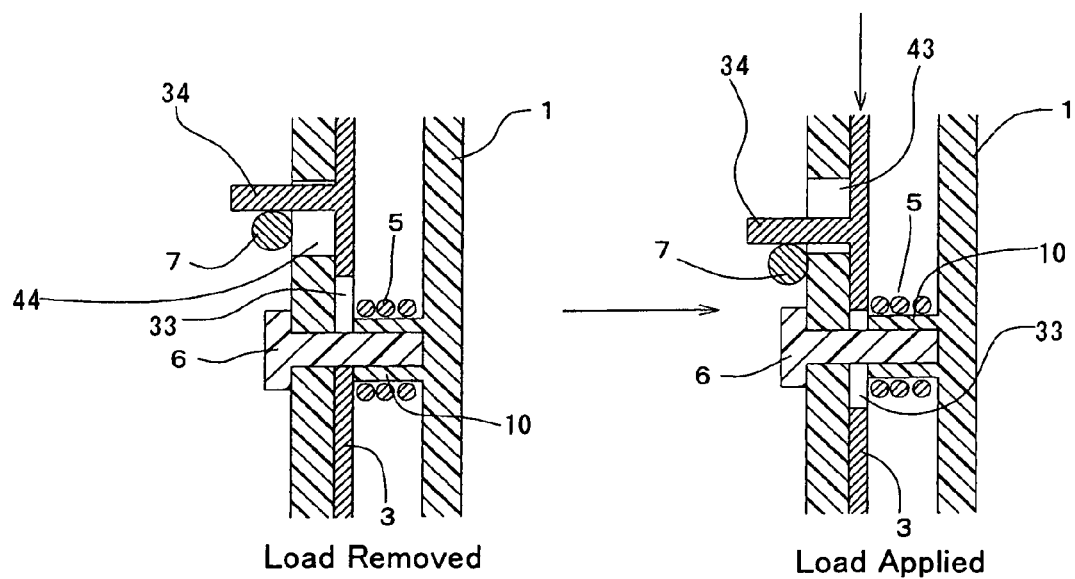
FIG. 5 is major cross-sectional diagrams of the storage apparatus according to the example of the present invention from which an excessive load is removed, and to which an excessive load is applied, respectively.

On the other hand, when an excessive load is applied to the lid member 2, which is placed in closing the opening of the container 1, from above, and if the applied excessive load is larger than the forces, which the springs 5 and torsion springs 7 act onto the lid member 2, the resinous bolts 6 move upward relatively within the slots 33, and the pins 34 move downward relatively within the descent grooves 44 as shown in FIGS. 4 and 5. Accordingly, the metal-plate arm 3 moves downward.

The metal-plate arm 3 is inhibited from moving downward when the contact surface 20 of the lid member 2 contacts with the surface of the receiver 12. Under the circumstance, note that the resinous bolts 6 do not reach the lower opposite end of the slots 33, and the pins 34 do not arrive at the lower opposite end of the descent grooves 44, either. Consequently, the receiver 12 receives the entire excessive load so that no load is applied to the metal-plate arm 3 and resinous bolts 6 substantially. Therefore, it is possible to prevent such a drawback that the metal-plate arm 3 deforms plastically from occurring.

All in all, the cup holder according to an example of the present invention can operate to open and close the lid member 2 stably, because the metal-plate arm 3 is inhibited from deforming plastically even when the lid member 2 is subjected to an excessive load from above.

INDUSTRIAL APPLICABILITY

The present storage apparatus can be applied to various storage apparatuses as far as they comprise a lid member, and an arm made integrally with the lid member, respectively, wherein the lid member swings to open and close the opening of storage apparatuses.

Having now fully described the present invention, it will be apparent to one of ordinary skill in the art that many changes and modifications can be made thereto without departing from the spirit or scope of the present invention as set forth herein including the appended claims.

What is claimed is:

1. A storage apparatus, comprising:
    a container body having a top opening;
    a first engagement member provided at an outer lower side of the container body;
    a lid member for opening and closing the top opening of the container body, wherein the lid member is held in a pivotal manner to the container body;
    an arm extending downward from the lid member;
    a second engagement member provided on the arm and being engageable with the first engagement member;
    a shaft for pivotally supporting the arm to the container body;
    an urging member for urging the lid member upward;
    an arc-shaped slot formed on the container body into which the shaft is fitted to pivotally hold the arm; and
    a descent slot that branches away from the arc-shaped slot and extends downward by a short distance in a radially inward direction of the arc-shaped slot, wherein
    the descent slot extends in a vertical direction when the lid member is in a closed position,
    the container body further includes a receiver, which is brought into contact with the lid member to support the lid member when the shaft moves relatively within the slot so that the lid member is moved downward,
    the receiver is located directly above the shaft and extends horizontally over a range of positions, and the receiver extends in a direction opposite to a direction in which the lid member moves when the lid member pivots to an open position from a location directly above the shaft,
    the first and second engagement members form a push-lock mechanism to enable the lid member to be locked in the closed position and to enable the lid member to be unlocked to the open position, and
    when no excessive load is applied to the lid member from above while the lid member covers the top opening of the container body, the lid member is in a floating state in which the lid member is spaced apart from the receiver, and when an excessive load is applied to the lid member from above while the lid member covers the top opening of the container body and the excessive load is larger than a force applied by the urging member to the lid member, the shaft moves downward and the lid member contacts the receiver such that the arm and the shaft do not receive the excessive load and are prevented from deforming, and the first engagement member is disengaged from the second engagement member so that the lid member moves from the closed position to the open position.

2. The storage apparatus set forth in claim 1, wherein the receiver has a cross section formed as an arc shape, which is free from interfering with the lid member.

3. The storage apparatus set forth in claim 1 further comprising a pin protruding from the arm, wherein:
    the container body is provided with a guide groove for guiding a movement of the pin accompanied by the swinging movement of the lid member; and
    the guide groove is provided with a descent groove for enabling the pin to move when the shaft moves relatively within the slot so as to move the lid member downward.

4. The storage apparatus set forth in claim 3, wherein the urging member urges the lid member upward by way of the pin.

5. The storage apparatus set forth in claim 1, wherein the arm is one of a pair of arms that extend downward from the opposite side surfaces of the lid member, respectively.

6. The storage apparatus set forth in claim 1, wherein the urging member urges the lid member by way of the arm.

7. The storage apparatus set forth in claim 1, wherein the receiver is disposed at a position that is above and rearward with respect to the shaft.

8. The storage apparatus set forth in claim 1, wherein the shaft is one of a pair of pivot shafts, which are disposed oppositely to each other; and the slot is one of a pair of slots, which are disposed oppositely to each other.

9. The storage apparatus set forth in claim 1, wherein the container body is provided with the shaft; and the arm is provided with the slot.

10. A storage apparatus, comprising:
    a container body having a top opening;
    a first engagement member provided at an outer lower side of the container body;
    a lid member for opening and closing the top opening;
    an arm extending downward from the lid member;
    a second engagement member provided on the arm and being engageable with the first engagement member;
    a shaft, which extends from one of the container and the arm, wherein the shaft extends between the arm and the container for pivotally supporting the arm to the container body;
    an oblong slot formed in the other of the container and the arm, wherein the shaft fits in the slot to pivotally support the arm, and wherein a longitudinal dimension of the slot extends in a vertical direction when the lid member is pivoted to cover the top opening so that the lid moves in an up-and-down direction, toward and away from the top opening of the container, when the shaft moves relatively within the slot;
    an urging member for urging the lid member in an upward direction;
    an arc-shaped slot formed on the container into which the shaft is fitted to pivotally hold the arm;
    a descent slot that branches away from the arc-shaped slot and extends vertically downward in a radially inward direction of the arc-shaped slot; and
    a receiver fixed to the container, wherein the receiver is a projection that projects upward from a rim defining the top opening of the container and includes an arcuate upper surface, the receiver is located directly above the shaft and intersects a vertical plane that includes a pivot axis of the shaft, the receiver extends horizontally in a range of positions on opposite sides of the imaginary vertical plane, the first and second engagement members form a push-lock mechanism to enable the lid member to be locked to cover the top opening of the container body and to enable the lid member to be unlocked to uncover the top opening of the container body, and when no excessive load is applied to the lid member from above while the lid member covers the top opening of the container body, the lid member is in a floating state in which the lid member is spaced apart from the receiver, and when an excessive load is applied to the lid member from above while the lid member covers the top opening of the container body and the excessive load is larger than a force applied by the urging member to the lid member, the shaft moves downward and the lid member contacts the arcuate surface of the receiver such that the arm and the shaft do not receive the excessive load and are prevented from deforming, and the first engagement member is disengaged from the second engagement member so that the lid member moves away from the top opening of the container.

11. The storage apparatus according to claim 10, wherein an arcuate recess is formed in a lower side of the lid that conforms to the receiver, and wherein the arcuate recess engages the upper surface of the receiver when the lid is in a fully closed position.

12. The storage apparatus according to claim 1, wherein the receiver has an upper surface for contacting the lid member, and the upper surface of the receiver is fixed and stationary with respect to the container.

13. The storage apparatus according to claim 10, wherein the arcuate upper surface of the receiver is fixed and stationary with respect to the container.

14. The storage apparatus according to claim 1, wherein when a load is applied to a portion of the lid member other than a top of the lid member in the closed position, the first engagement member remains engaged with the second engagement member and the lid member remains locked in the closed position.

15. The storage apparatus according to claim 10, wherein when a load is applied to a portion of the lid member other than a top of the lid member when the lid member covers the top opening, the first engagement member remains engaged with the second engagement member and the lid member covers the top opening.

* * * * *